March 27, 1956 T. F. DOUMANI 2,739,927
CATALYTIC PROCESS
Filed May 3, 1951

INVENTOR.
THOMAS F. DOUMANI,
BY Ross J. Garofalo
ATTORNEY.

2,739,927
Patented Mar. 27, 1956

United States Patent Office

2,739,927
CATALYTIC PROCESS

Thomas F. Doumani, Los Angeles, Calif., assignor to Union Oil Company of California, Los Angeles, Calif., a corporation of California Application May 3, 1951, Serial No. 224,381

5 Claims. (Cl. 196—49)

This invention relates generally to catalysts and catalytic processes for the conversion of hydrocarbons and hydrocarbon mixtures. More particularly this invention relates to the use of group VIII metal catalysts in conjunction with certain halogen-containing catalysts whereby the upgrading of each catalyst is utilized without excessive carbon deposition and short operating cycles.

The present trend in catalytic reforming of gasoline stocks is toward non-regenerative catalysts which may be employed for periods up to six months without regeneration by oxidation. The non-regenerative processes have the advantage of requiring smaller equipment and lesser amounts of catalyst for a given throughput of feed stock since no offstream time is required for regeneration.

Group VIII metals such as platinum have been employed in non-regenerative processes. The activity of such catalysts may be improved by the incorporation of certain halogens into the catalyst. The use of the halogen while increasing the activity, generally contributes to increased carbon deposition and decreased thermal stability so that periodic regenerations are more frequently required and the catalyst is thereby more rapidly destroyed as a result of numerous regenerations.

It has now been found that the advantages of a combined group VIII metal-halogen catalyst may be obtained by the use of two catalytic processing zones wherein the primary zone contains a platinum or other group VIII metal catalyst and the secondary zone contains a catalyst containing halogen either with or without a group VIII metal, or alternatively the secondary zone contains an admixture of a halogen catalyst with a group VIII metal catalyst.

The primary conversion of the feed stock with a group VIII metal catalyst greatly decreases the carbon-forming tendency during the subsequent contact with a halogen-containing catalyst in the secondary conversion zone and thereby minimizes the necessity for frequent regeneration thereof. The absence of halogen in the primary zone and the preliminary processing also decreases the carbon laydown therein.

It is therefore an object of this invention to provide a method for using group VIII metal catalysts with halogen-containing catalysts during hydrocarbon processing whereby a minimum carbon deposition takes place on either catalyst.

It is another object of this invention to take maximum advantage of the upgrading characteristics of group VIII metal catalysts such as platinum catalysts, by usage in conjunction with a halogen-containing catalyst.

It is another object of this invention to provide a process for catalytic reforming of gasolines with group VIII metal catalysts wherein long on-stream periods between regenerations may be employed.

Other objects and advantages of this invention will become apparent to those skilled in the art as the description thereof proceeds.

Briefly this invention relates to the use of certain group VIII metal catalysts in a primary conversion zone in conjunction with the use of halogen-containing catalysts in a secondary conversion zone. The halogen-containing catalysts in the secondary conversion zone may be admixed with portions of the group VIII metal catalyst wherein the group VIII metal catalyst constitutes between about 10% and 90% by weight of the admixture.

It has been found that a preliminary treatment of a hydrocarbon stock in the presence of hydrogen and a group VIII metal catalyst greatly decreases the carbon-forming tendency when such feed stock is subsequently contacted with a halogen-supported catalyst or with a mixture of a halogen-containing catalyst and a group VIII metal catalyst. When a hydrocarbon feed stock such as gasoline is processed in a two-zone operation of this type, the advantages of a combined group VIII metal-halogen catalyst are obtained without the customary disadvantages of inferior heat stability and increased carbon deposition attributable to the presence of the halogen. These advantages are not obtained however where the feed stock is subjected to conversion with a halogen-containing catalyst or where the feed stock is subjected to conversion with a mechanical mixture of a group VIII metal catalyst and a halogen-containing catalyst in the absence of a group VIII metal primary conversion zone.

In the process of this invention the feed stock is first contacted with a group VIII metal-containing catalyst in a primary conversion zone in the presence of hydrogen and is thereafter contacted in a secondary conversion zone with a halogen-containing catalyst. In one modification of the invention the secondary conversion zone may include a group VIII metal in combination therewith, or in another modification of the invention may be admixed with a separate catalyst containing a group VIII metal. Alternatively the halogen-containing catalyst may be employed in the secondary conversion zone in the absence of a group VIII metal.

Where mixed catalysts are employed in the secondary conversion zone, moving beds may be employed and the effluent catalyst mixture from the secondary conversion zone may be separated into the component catalysts by screening, elutriation and the like. The halogen-containing catalyst will generally contain substantially all the carbon deposits and it may be regenerated separately while the group VIII metal catalyst may be recycled without regeneration. Where fixed beds of mixed catalysts are employed in the secondary conversion zone, the regeneration of the halogen-containing catalyst may be carried out batch-wise either in the absence or presence of the group VIII metal catalyst.

Figure 1:
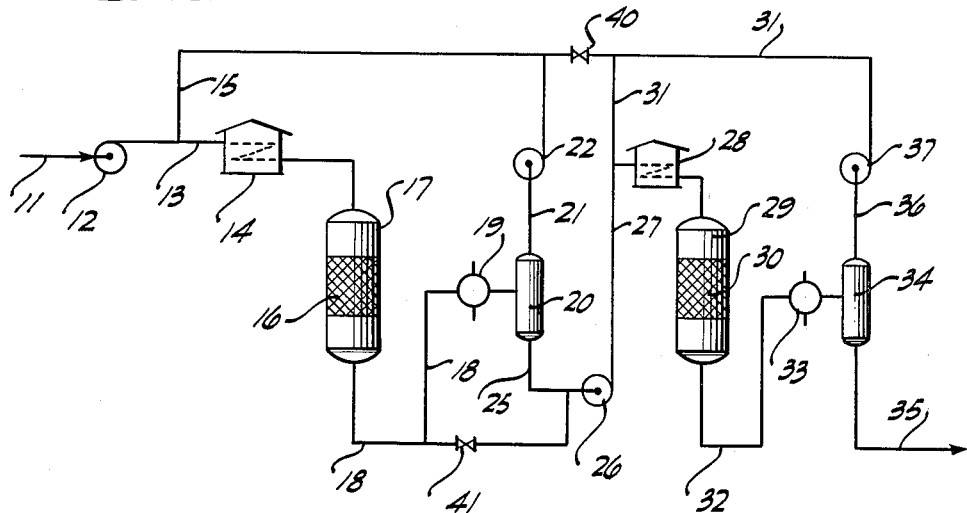
Figure 1 shows a catalytic process employing a single reactor for the primary conversion zone and a second reactor for the secondary conversion zone wherein the secondary conversion zone contains a halogen-containing catalyst.

Hydrocarbon feed stocks which may be employed in this invention are lower boiling hydrocarbon stocks such as those boiling generally below about 800° F. The preferred feed stocks are those which boil below about 500° F. and are therefore of the gasoline boiling range.

The group VIII metals which may be employed in the catalysts of this invention include iron, cobalt, nickel, ruthenium, rhodium, palladium, osmium, iridium, and platinum. Ruthenium and iridium are somewhat inferior to the remaining metals of this group for the purposes of this invention however. The preferred catalysts are platinum and rhodium either singly or in combination.

The group VIII metal catalyst may be prepared by any well known method such as by impregnation, co-precipitation, co-gelling, co-pilling or the like. In general such catalysts are prepared in the form of the oxides or sulfides which are subjected to reduction in the presence of hydrogen at or near the reaction temperature to furnish the finished active catalyst.

Where fairly large sized catalyst particles such as 3/16 inch pills or larger are employed, it is preferable to employ impregnated group VIII metal catalysts. Where smaller sized catalyst particles are employed such as 1/8 inch pills or smaller, it is generally preferable to employ co-precipitated or co-pilled catalysts. Co-precipitated catalysts may be prepared by simultaneously precipitating alumina gel and a group VIII metal such as in the form of an oxide or a sulfide. Thus iron hydroxide, nickel sulfide, platinum sulfide and the like may be simultaneously precipitated with alumina gel by appropriate mixing of soluble group VIII metal salts with alumina salts in the presence of a precipitating agent. Co-pilled catalysts may be prepared by mixing previously precipitated gels of the group VIII metal with those of alumina, or alternatively the second gel may be precipitated in the presence of a suspension of the other gel. Thus platinum sulfide may be precipitated in the presence of alumina gel by slurrying a suspension of alumina gel with chloroplatinic acid with the simultaneous introduction of hydrogen sulfide. Other group VIII metal gels may be prepared similarly.

For the preparation of impregnated catalyst alumina and high surface area inorganic oxides containing a major proportion of alumina are preferred. With such catalysts it appears possible that the active catalytic agent may be even a kind of loose compound between the alumina and the group VIII metal salt. Thus it has been found that silica, activated carbon, and celite are entirely unsuited for supporting platinum or rhodium catalysts in the absence of alumina.

Alumina gels containing between about 1% and 15% and preferably between about 3% and 8% of co-precipitated silica are especially suitable carriers. The presence of the small amount of silica in the alumina appears to stabilize the resulting catalyst and prolongs the catalyst life as is described in U. S. Patent 2,437,532.

Prior to the impregnation step or steps, the carrier is normally shaped into the physical form desired for the catalyst. For this purpose the dried carrier is usually ground, mixed with a lubricant such as graphite or hydrogenated vegetable oil, and pilled. In the activation of the carrier by heating the lubricant is removed by combustion. Alternatively the carrier may be used in granular form; or it may be ground into powder, made into a paste and extruded. Where the catalyst is to be employed in a fluidized system, the carrier is formed into a finely divided state as in micro-bead form, or it is ground into a fine state and is thereafter impregnated. In the case of the fluidized process the carrier can be impregnated in larger form, e. g. granules, pills, etc., and thereafter ground to the desired powder size for the processing.

The group VIII-containing impregnation solution is prepared from water-soluble salts of the group VIII metals such as chlorides, sulfates, nitrates and the like. Thus rhodium chloride, rhodium sulfate, rhodium nitrate, rhodium phosphate, platinum chloride, chloroplatinic acid, platinum nitrate, palladium nitrate, palladium sulfate, ferric nitrate, ferric sulfate, ferric chloride, nickel nitrate, cobalt chloride, cobalt nitrate and the like may be employed for the preparation of impregnation solutions.

The concentration of the group VIII metal in the impregnation solution will depend generally upon the particular carrier being employed and upon the desired concentration of the group VIII metal in the finished catalyst. Where the finished catalyst contains between about 0.001% and 0.5% by weight of the group VIII metal, the group VIII metal-containing impregnation solution will have a concentration of the group VIII metal ranging from about 0.002 to 1.0 gram of metal per 100 ml.

While the catalyst prepared by this method may contain different percentages of the group VIII metal, those containing between about 0.001% and 0.5% by weight and preferably between about 0.01% and 0.3% by weight of the group VIII metal calculated as the metal are most generally employed. Generally speaking iron, cobalt and nickel are not as active in the lower concentrations as are most other members of the group VIII series and where these metal are employed the catalyst usually contains between about 0.001% and 7% by weight of the metal. Ruthenium and iridium appear to be less active than iron, cobalt and nickel.

After immersion in the impregnation solution a part of the impregation solution is adsorbed by the carrier and the excess solution is thereafter removed. The impregnated carrier after draining and drying in a low temperature oven such as at 180° F. to 300° F., for example, is finally activated by heating to a temperature of 600° F. to 1000° F. for two to six hours.

In certain cases minor amounts of other metals may be combined with the customary group VIII metal-containing catalyst. However, the group VIII metal catalyst will always contain a minor proportion of the group VIII metal and a major proportion of a carrier.

The preferred method for preparing a halogen catalyst of this invention is by impregnation of the carrier with a halogen-containing acid. As in the case of the group VIII metal catalyst, the impregnation of the carrier follows a suitable activation of the carrier to render it sufficiently adsorbent for the impregnation step. As in the case of the group VIII metal catalysts, the carrier is normally shaped prior to impregnation.

In the preparation of a carrier for impregnation with hydrofluoric acid, hydrochloric acid and the like, the activation step is carried out by heating the carrier in order to render it sufficiently adsorbent for impregnation. This activation may be effected by heating from two to six hours at 600° F. to 1000° F., for example. Often, activation temperatures as low as about 500° F. may be employed. After the carrier has been cooled, it is immersed in the acid impregnation solution.

A part of the impregnation solution is adsorbed by the carrier, and the non-adsorbed excess solution is removed after a suitable impregnation period such as between about ten minutes and one hour. The impregnated carrier after draining is dried in a low temperature oven which may be maintained between 180° F. and 300° F., for example, in order to remove the bulk of the water. The halogen-impregnated carrier is thereafter activated by heating to a temperature between about 600° F. and 1000° F. for two to six hours, for example, in order to condition the catalyst for catalytic reaction. In certain cases a series of several halogen-containing acid impregnations may be made in order to obtain a suitably high content of halogen on the finished catalyst.

The halogen impregnation solution according to the method of this invention may be prepared from fluorine-containing inorganic acids such as hydrofluoric acid, fluorosulfonic acid and flurosilicic acid and the like. Where chlorine-containing acids are employed, hydrochloric acid, chlorosulfonic acid and the like may be employed.

In general the fluorine or chlorine retained by the carrier varies directly with the concentration of the impregnating solution. With the use of alumina carriers it has been found that the preparation of catalysts containing between 0.2% and 5% by weight of fluorine or chlorine required impregnating solutions containing between about 0.4 and 10.4 grams of fluorine (as F) or chlorine (as Cl) per 100 ml. of solution.

While other concentrations of fluorine or chlorine may sometimes be employed, we generally employ between about 0.05% and 5% of fluorine or chlorine and we prefer to employ between about 0.2% and 3% of fluorine or chlorine based upon the finished catalyst.

In the preferred method of the invention the catalyst in the secondary conversion zone will comprise a halogen-impregnated catalyst prepared according to the method just described. However in certain cases other metals including metals of the group VIII class may be incorporated in the halogen-containing catalyst. Such materials may be introduced by co-impregnation as where the halogen-containing acid and the group VIII metal are simultaneously present in a single impregnation solution, or alternatively, two-stage impregnation may be employed wherein the halogen-containing acid is introduced in one impregnation step and the metal is introduced in another impregnation step either before or after the halogen impregnation step.

The primary conversion zone containing the group VIII metal catalyst serves to effect the reforming of gasoline boiling range hydrocarbon stocks in order to improve the octane rating, decrease the gum-forming tendencies, effect mild desulfurization, isomerization, dehydrogenation, hydrogenation and otherwise improve the stock. Such reactions are carried out in the presence of hydrogen at temperatures in the range of 700° F. to 1000° F. and preferably in the range of about 850° F. to 950° F. Under the reaction conditions hydrogen is produced which is customarily recycled with the incoming feed stock to the primary conversion zone. The reaction is carried out at pressures between about atmospheric and 2000 p. s. i. and preferably in the range of 50 p. s. i. to 1000 p. s. i. The feed rate may vary between about 0.2 and 10.0 volumes of liquid feed stock per volume of catalyst per hour and between about 500 and 10,000 cubic feet of recycle hydrogen is employed per barrel of feed.

These reactions may be carried out in a single catalyst case or reactor, or in a plurality of catalyst cases, either in series or in parallel. Alternatively the catalyst may be employed in moving bed, fluidized bed or other such types of catalytic processes.

During usage small amounts of deposit comprising mostly carbon, nitrogen and sulfur compounds accumulate on the catalyst. The slow build-up of such deposit is not serious and does not impair the catalyst activity for a considerable period of time such as up to several months in the case of the platinum catalyst. These deposits may be removed from time to time as the activity declines by combustion with air at controlled oxidation temperatures such as below 1100° F., but each regeneration partially destroys the activity of platinum catalyst. Normally the group VIII catalysts of this invention are employed for long periods between regenerations. After regeneration the catalyst is reduced with hydrogen prior to its employment for hydrocarbon conversions.

The hydrogen-containing effluent gases from the primary conversion zone may be passed directly to the secondary conversion zone or alternatively this stream may be cooled to separate a portion of the hydrogen for recycle to the primary conversion zone or otherwise purified such as by removing hydrogen sulfide, ammonia and the like prior to passage to the secondary conversion zone. In one modification of the invention the primary and secondary conversion zones are juxtaposed one above the other in a single catalyst case or vessel in which case the hot effluent passes directly from the one zone to the other.

In the secondary conversion zone the gasoline boiling range hydrocarbons are again improved with respect to octane rating, gum-forming tendencies, desulfurization, isomerization, dehydrogenation, hydrogenation and the like. In the presence of the halogen-containing catalyst, either singly or in admixture with a group VIII metal-containing catalyst, these reactions are carried out in the presence of hydrogen at temperatures in the range of 700° F. to 1000° F. and preferably in the range of about 850° F. to 950° F. Under the reaction conditions hydrogen is produced which is customarily recycled with the feed to the secondary conversion zone. The reaction is carried out at pressures between about atmospheric and 2000 p. s. i. and preferably in the range of 50 p. s. i. to 1000 p. s. i. The feed rate may vary between about 0.2 and 10.0 volumes of liquid feed stock per volume of catalyst per hour and between about 500 and 10,000 cubic feet of recycle hydrogen is employed per barrel of feed.

These reactions, as in the case of the group VIII metal catalyst in the primary conversion zone, may be carried out in a single catalyst case or in a plurality of catalyst cases either in series or in parallel, or alternatively the catalyst may be employed in moving bed, fluidized bed or other such types of catalytic processes.

Generally speaking the major hydrogen production takes place in the primary conversion zone and usually some hydrogen consumption occurs in the secondary conversion zone. Accordingly where the two zones are maintained in separate catalyst cases a portion of the hydrogen is recycled with the incoming feed to the primary conversion zone while a second portion is recycled with the feed to the secondary conversion zone. In the preferred modification such recycle hydrogen is freed of contaminants such as hydrogen sulfide and ammonia which tend to poison the catalyst for the reactions. The catalyst in the secondary conversion zone will generally undergo a more rapid carbon deposition than in the primary zone principally because of the presence of the halogen. Such catalyst will generally require more frequent regeneration than that of the primary conversion zone. Because of the relatively low cost of the halogen-containing catalyst, it may be more frequently regenerated and more frequently replaced, than is the more expensive catalyst of the primary conversion zone.

Referring now more particularly to Figure 1 a hydrocarbon feed stock is introduced through line 11, pump 12 and line 13 whence it flows through heater 14 and is vaporized therein. Recycle hydrogen from line 15 passes through heater 14 in the same lines with the feed stock or in separate lines. The mixture of feed stock and recycle hydrogen passes through primary conversion catalyst zone 16 within reactor 17 and undergoes catalytic reforming therein. Primary conversion zone 16 is charged with a group VIII metal catalyst of the type described hereinbefore and serves as a primary conversion zone catalyst.

Effluent from reactor 17 passes through line 18 to interchanger 19 wherein it is condensed to form a hydrogen-rich gas and a liquid hydrocarbon phase which mixture passes to separating vessel 20. In separating vessel 20 the hydrogen-rich gas is withdrawn from the top through line 21, compressor 22 whence it flows through hydrogen recycle line to heater 14.

Liquid product accumulating in separating vessel 20 is withdrawn through line 25 whence it flows through pump 26 and line 27 to heater 28 and thence to reactor 29 containing secondary conversion zone 30. Recycle hydrogen from line 31 passes through heater 28 and flows through secondary conversion zone 30. Secondary conversion zone 30 is charged with a halogen catalyst which may or may not contain a group VIII metal or which may be admixed with a group VIII metal catalyst.

Effluent from secondary conversion zone 30 flows through line 32, interchanger 33 to separating vessel 34. Liquid product is discharged from the bottom of separating vessel 34 through line 35 while hydrogen-rich gas is withdrawn from the top of separating vessel 34 through line 36, compressor 37, whence it flows through line 31 to the recycle hydrogen stream.

In general there is a net production of hydrogen in primary conversion zone 16 and a net consumption of hydrogen in secondary conversion zone 30. Accordingly a portion of the hydrogen-rich gas in recycle line 15 is passed to recycle hydrogen line 31 by opening valve 40. In certain cases hydrogen production may occur in the secondary conversion zone 30 in which case hydrogen passes through valve 40 in the reverse direction.

In certain instances the entire effluent of primary conversion zone 16 is passed to secondary conversion zone 30 without hydrogen separation. In this instance hot vapors containing hydrogen flowing in line 18 are passed through valve 41 to pump 26 whence they flow as described hereinbefore to secondary conversion zone 30.

Figure 2:
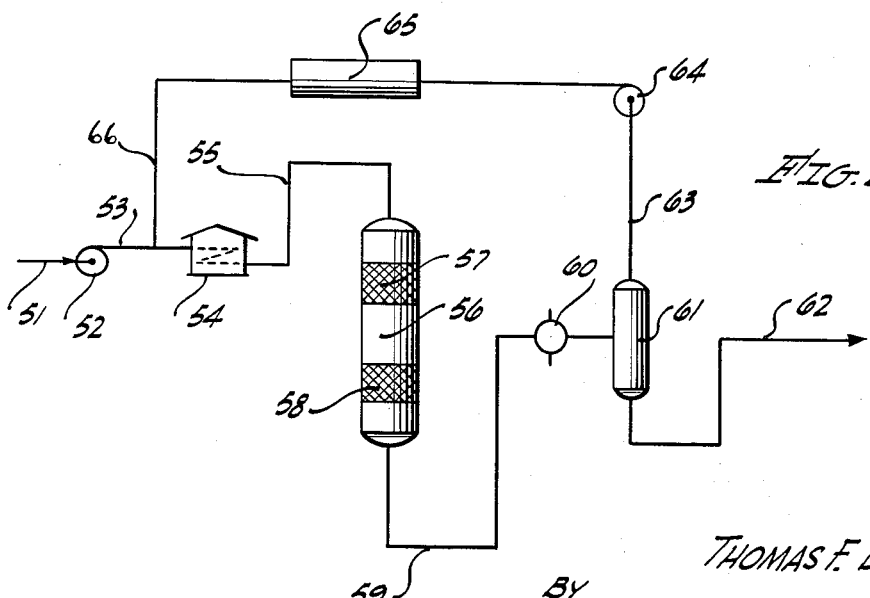
Figure 2 shows a modification of the invention employing a primary conversion zone and a secondary conversion zone in a single reactor wherein the secondary conversion zone contains a halogen-containing catalyst.

Figure 2 shows an alternative modification of the invention employing a primary and secondary conversion zone in a single reactor.

Referring now more particularly to Figure 2, feed stock flows through line 51, pump 52 and line 53 to heater 54 wherein it is vaporized in the presence of hydrogen from recycle line 66. Vaporized hydrocarbon and hydrogen flow through line 55 to reactor 56 which encloses primary conversion zone 57 and secondary conversion zone 58.

Primary conversion zone 57 is charged with a group VIII metal catalyst while secondary conversion zone 58 is charged with a halogen-containing catalyst or with a mixture of a halogen-containing mixture with a group VIII metal-containing catalyst.

The flow of vapors and hydrogen through reactor 56 is such that the vapors first contact primary conversion zone 57 and the converted effluent from primary conversion zone 57 then flows through secondary conversion zone 58 and thence is discharged through line 59.

Reactor effluent in line 59 passes through cooler 60 and is discharged into separating vessel 61 wherein the condensed vapors separated in the bottom end are discharged through product line 62. Hydrogen-rich gas in separating vessel 61 is discharged through line 63 whence it flows through compressor 64 to hydrogen purification section 65.

In hydrogen purification section 65 the recycle hydrogen is chemically or physically purified to remove hydrogen sulfide, ammonia and light hydrocarbon gases such as methane, ethane and propane, either singly or collectively. Such purification may be effected by adsorption, absorption, scrubbing, solvent extraction, treatment with acids, alkalis, metal salts and the like. The removal of light hydrocarbon gases prevents a build-up of inert contaminants in the recycle hydrogen stream and the removal of ammonia and hydrogen sulfide minimizes poisoning of the catalysts. Recycle hydrogen after purification in section 65 passes to line 66 and thence through line 53 to heater 54 as described hereinbefore.

Perhaps the process of this invention is best illustrated by the following specific example:

A platinum-alumina catalyst was prepared from a gel precipitated from aluminum nitrate with aqueous ammonium hydroxide followed by three washes with large amounts of distilled water containing a small amount of NH$_4$OH added to prevent loss of the gel through the filter, and finally three washes with distilled water without added ammonium hydroxide. Sufficient chloroplatinic acid was added to form a gel containing 0.1 per cent platinum. Gaseous hydrogen sulfide was then passed into the alumina-platinum mixture at room temperature to convert the platinum to its sulfide. This catalyst was dried and pelleted to 3/16 inch pellets. This was designated catalyst No. 1.

An alumina gel was pelleted to form 1/8 inch pellets and was impregnated with hydrofluoric acid in water to form an alumina gel containing about 1% of fluorine as F. After immersion for about 15 minutes in the impregnating solution, the carrier was drained and dried at about 300° F. The resulting catalyst was designated catalyst No. 2.

A catalyst containing 0.1% platinum and 1% of fluorine as HF was prepared by impregnating a portion of the alumina gel with aqueous chloroplatinic acid and after sulfiding and drying, re-impregnating with aqueous hydrofluoric acid. This catalyst was designated catalyst No. 3.

The foregoing catalysts were then tested as follows: In experiment A, a 100 ml. catalyst bed consisting entirely of catalyst No. 1 was employed. In experiment B, 100 ml. of catalyst No. 3 was employed. In experiment C, 50 ml. of catalyst No. 1 and 100 ml. of catalyst No. 3 were employed so that the catalyst No. 1 contacted the feed prior to catalyst No. 3. In experiment D, 50 ml. of catalyst No. 1 contacted the feed first which was followed by 100 ml. of an intimate mixture of equal parts by volume of catalyst No. 1 and No. 2.

The catalysts were then tested under the following reaction conditions:

| | |
|---|---|
| Temperature, °F | 900 |
| Pressure, p. s. i | 450 |
| Process time, hours | 4 |
| Liquid hourly space velocity | 2.0 |
| Hydrogen addition, cu. ft./barrel of feed | 5000 |

For testing these catalysts gasoline stock boiling substantially in the range of between 200° F. and 400° F. obtained by distillation of a California crude was employed. The gasoline contained about 12% aromatics and had an F-1 clear octane rating of 66 which increased to 78 upon the addition of 3 ml. of tetraethyl lead fluid.

The liquid products obtained from the four experiments were then tested to determine their octane ratings by the F-1 method, clear and with 3 ml. TEL fluid. The following results were obtained:

| Test | Octane Ratings | |
|---|---|---|
| | Clear | 3 ml. TEL |
| Feed | 66 | 78 |
| A. 100 ml. Pt-catalyst | 76.5 | 91 |
| B. 100 ml. Pt-HF catalyst | 78 | 92.5 |
| C. 50 ml. Pt catalyst followed by 100 ml. of Pt-HF catalyst | 80.5 | 94 |
| D. 50 ml. Pt catalyst followed by 100 ml. of admixture of Pt and HF catalysts | 82.5 | 95.0 |

While runs C and D employed larger catalyst beds than A and B, the results are comparable because of the constant liquid hourly space velocity (volume of feed per volume of catalyst per hour).

The foregoing data show that the use of a catalyst containing both platinum and halogen is superior to a catalyst containing only platinum. A comparison of tests B and C show that a primary conversion with a platinum catalyst followed by a secondary conversion with a platinum halogen catalyst gives a better product than is obtained with a single catalyst containing both platinum and halogen. Furthermore still better results are obtained where a portion of the platinum catalyst is employed for primary conversion of the feed stock, and the product therefrom then contacts a mixed bed of a platinum catalyst and a halogen catalyst in the secondary conversion zone.

Similar results are obtained where the sulfiding of catalysts Nos. 1 and 3 are omitted.

Substantially the same favorable results are obtained when either rhodium or palladium is substituted for the platinum in the foregoing experiments. When hydrochloric acid is substituted for the hydrofluoric acid, the same favorable results of catalyst distribution are obtained with the exception that the chlorine-containing catalysts are somewhat less active than the fluorine-containing catalysts.

When an alumina-silica gel containing about 5% by weight of SiO$_2$ is substituted for the alumina gel, substantially the same results are obtained. However the silica-alumina gel gives a catalyst which tends to retain its high activity on repeated regeneration.

From the foregoing description of this invention it is apparent that in broad aspect it relates to a new method for the catalytic processing of hydrocarbon stocks in two successive zones wherein the feed stock is passed into contact with a group VIII metal-containing catalyst in the absence of halogen in a primary conversion zone, and the effluent from the primary zone, with or without purification, is processed in a secondary conversion zone containing a halogen-containing catalyst which may be employed in admixture with a group VIII metal catalyst or which may, or may not, contain a group VIII metal.

The foregoing disclosure of this invention is not to be considered as limiting since many variations may be made by those skilled in the art without departing from the scope or spirit of the following claims.

I claim:

1. A process for the catalytic reforming of gasoline-boiling range hydrocarbons which comprises subjecting said hydrocarbons to a temperature between about 700° F. and 1000° F. in the presence of hydrogen and a primary conversion zone catalyst, said primary conversion zone catalyst consisting essentially of a predominantly alumina carrier and between about 0.001% and 0.5% by weight of platinum, and thereafter subjecting said hydrocarbons to a temperature between about 700° F. and 1000° F. in the presence of hydrogen and a secondary conversion zone catalyst, said secondary conversion zone catalyst being composed of two discrete particle-form components intermingled with each other, one of said components consisting essentially of a predominantly alumina carrier and a minor proportion of a halogen selected from the class consisting of chlorine and fluorine, and the other of said components consisting essentially of an alumina carrier and a minor proportion of platinum.

2. A process according to claim 1 wherein said alumina-halogen component is periodically separated from said alumina platinum component and replaced with a freshly activated alumina-halogen component.

3. A process according to claim 1 wherein said halogen is fluorine.

4. A process as defined in claim 1 wherein at least one of said carriers consists essentially of a coprecipitated alumina-silica gel containing between about 1% and 15% by weight of silica and between about 85% and 99% of alumina.

5. In a process for the catalytic reforming of gasoline fractions in the presence of hydrogen and platinum-alumina catalysts, the improvement which comprises conducting at least a portion of said reforming at a temperature between about 700° and 1000° F. in the presence of hydrogen and a catalyst composed of two discrete particle-form components intermingled with each other, one of said components consisting essentially of a predominantly alumina carrier and a minor proportion of a halogen selected from the class consisting of chlorine and fluorine, and the other of said components consisting essentially of a predominantly alumina carrier and a minor proportion of platinum.

References Cited in the file of this patent

UNITED STATES PATENTS

| | | |
|---|---|---|
| 2,285,727 | Komarewsky | June 9, 1942 |
| 2,348,557 | Mattox | May 9, 1944 |
| 2,479,110 | Haensel | Aug. 16, 1949 |
| 2,573,149 | Kassel | Oct. 30, 1951 |
| 2,596,145 | Grote | May 13, 1952 |

OTHER REFERENCES

Kastens et al.: "Platinum Reforming of Gasoline," Industrial and Engineering Chemistry, vol. 42, pages 582–593 (pages 585–589 relied upon), April 1950.

Haensel: "Platforming," The Petroleum Engineer, vol. 22, pages C–9, 12, 14, April 1950.